US009387808B2

(12) United States Patent
Kearney et al.

(10) Patent No.: US 9,387,808 B2
(45) Date of Patent: Jul. 12, 2016

(54) REMOVABLE MEDIA TRAY ASSEMBLY AND METHOD

(71) Applicant: Honda Motor Co., Ltd., Tokyo (JP)

(72) Inventors: Christian P. Kearney, Upper Arlington, OH (US); Nathan F. Franck, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 3 days.

(21) Appl. No.: 14/252,810

(22) Filed: Apr. 15, 2014

(65) Prior Publication Data

US 2015/0291104 A1 Oct. 15, 2015

(51) Int. Cl.
| B60R 7/06 | (2006.01) |
| B60R 11/02 | (2006.01) |
| B60R 7/08 | (2006.01) |
| B60R 7/04 | (2006.01) |
| B60R 11/00 | (2006.01) |

(52) U.S. Cl.
CPC ... *B60R 7/06* (2013.01); *B60R 7/04* (2013.01); *B60R 7/08* (2013.01); *B60R 11/0241* (2013.01); *B60R 2011/0005* (2013.01); *B60R 2011/0007* (2013.01)

(58) Field of Classification Search
CPC ............. B60R 7/04; B60R 7/06; B60R 7/08; B60R 11/0241; B60R 2011/0005; B60R 2011/0007

See application file for complete search history.

(56) References Cited

U.S. PATENT DOCUMENTS

| 4,469,365 | A | 9/1984 | Marcus et al. |
| 4,973,020 | A | 11/1990 | Canadas |
| 7,240,941 | B2 | 7/2007 | Adams et al. |
| 7,280,656 | B2 | 10/2007 | Peiker |
| 7,726,527 | B2 * | 6/2010 | Lota ............................. 224/275 |
| 7,817,436 | B2 | 10/2010 | Peiker |
| 2003/0107228 | A1 | 6/2003 | Ono et al. |
| 2007/0119885 | A1 * | 5/2007 | Miller et al. .................. 224/275 |
| 2011/0084511 | A1 * | 4/2011 | Evans ...................... B60R 7/06 296/37.12 |
| 2011/0156418 | A1 * | 6/2011 | Thorsell et al. ............ 296/24.34 |
| 2011/0169291 | A1 | 7/2011 | Siethorst et al. |

* cited by examiner

*Primary Examiner* — Glenn Dayoan
*Assistant Examiner* — Melissa A Black
(74) *Attorney, Agent, or Firm* — Rankin, Hill & Clark LLP (57) ABSTRACT

A removable media tray assembly and method for a vehicle includes a console structure disposed in the vehicle and defining a storage compartment, and a pivoting support tray removably and complementarily received by the console structure to close the storage compartment and provide a horizontal support surface for supporting an object.

20 Claims, 11 Drawing Sheets

REMOVABLE MEDIA TRAY ASSEMBLY AND METHOD

BACKGROUND

With the proliferation of portable electronic devices, and particularly mobile phones, vehicle designers continue to focus attention on improving vehicle interiors to better accommodate such portable electronic devices. One challenge is how to manage the cord or cords that are often associated with such portable electronic devices. For example, some portable electronic devices are connected to the vehicle for supplying power from a power source to the portable electronic device. In addition or in the alternative, portable electronic devices are sometimes connected to the vehicle via a cord for transmitting data to and/or receiving data from the vehicle. Generally, users desire the ability to store their portable electronic devices in the vehicle in a convenient manner and to connect their portable electronic devices to the vehicle in a convenient manner, while simultaneously desiring good design aesthetics. For example, users desire to have the cord, or at least a portion thereof, associated with a portable electronic device out of sight to improve aesthetics inside the vehicle and/or to reduce entanglement with the cord.

One known method for cord management involves the use of a removable tray. Such a removable tray can be a tray that is taken out and set aside when not in use. A space can be provided below the tray for other storage. These trays or the surrounding structure often include a slot or other aperture for a cord associated with a portable electronic device to enter and exit. The slot or aperture enables the tray to be disposed over the portable electronic device cords thereby hiding them and keeping them well organized. Another known method for cord management involves the use of doors. Such doors can slide into a center console or pivot out of the way, for example. Typically, such sliding doors are guided by a track and retract into a center console. They can have a space for storage therebelow, which allows users to access the cords when they need to and hide them when they are not needed. There may be a storage space disposed behind the pivoting door. Once closed, the door can hide the cords, and can allow access to them for charging purposes.

Notwithstanding known methods for cord management, there continues to be a problem associated with unsightly cords and crowding of the center console. This problem is often compounded due to a very small amount of available space, such as the small amount of space available below a center console where many other vehicle associated components and wiring are already provided. Another challenge is to accommodate customers that have less of an interest in accommodating a portable electronic device and more interest in having additional storage volume and locations. These customers may view dedicated and/or fixed features as a hindrance to full satisfaction with the vehicle. A still further challenge is the need to provide such an arrangement that can be easily cleaned out (e.g., when there is a spill).

SUMMARY

According to one aspect, a removable media tray assembly for a vehicle includes a console structure disposed in the vehicle and defining a storage compartment, and a pivoting support tray removably and complementarily received by the console structure to close the storage compartment and provide a horizontal support surface for supporting an object.

According to another aspect, a removable tray assembly disposed in a vehicle includes a center console structure defining an upward facing storage compartment, and a support tray removeably supported on the center console structure above the upward facing storage compartment for supporting an associated object. The support tray is complementarily received between walls of the center console structure and configured to pivot relative to the center console structure between a first position for installing and removing the support tray and a second position fro locking the support tray to the center console structure.

According to a further aspect, a vehicle removable media tray method is provided. In the method according to this aspect, a console structure disposed in a vehicle is provided, wherein the console structure defines a storage compartment. A pivoting support tray having a horizontal support surface disposed thereon is also provided. The pivoting support tray is removably and complementarily installed on the console structure over the storage compartment to close the storage compartment.

DETAILED DESCRIPTION

Figure 1A:
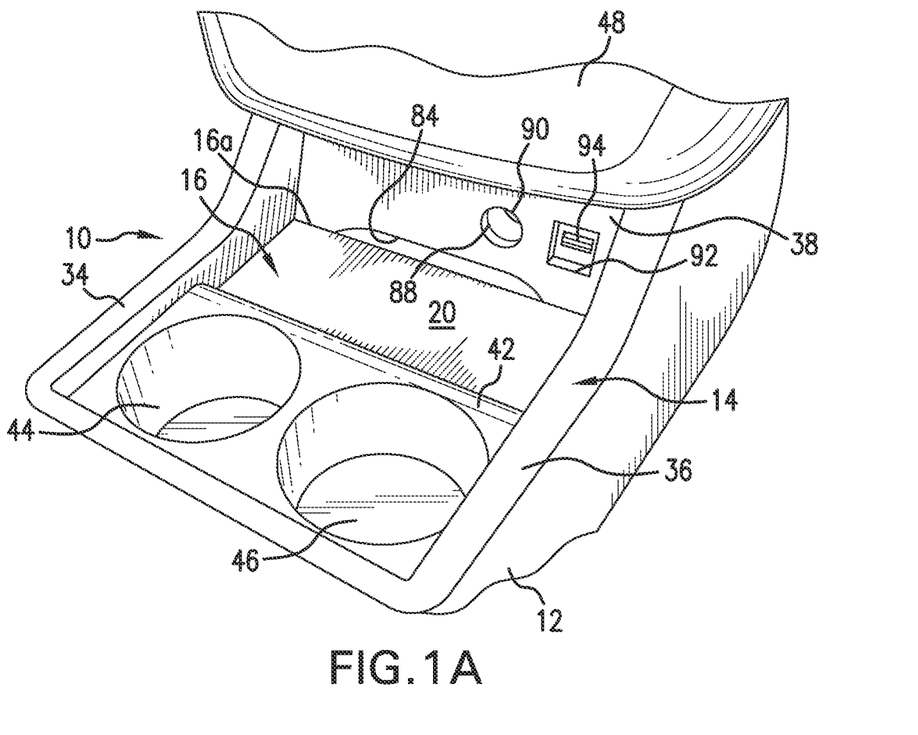
FIG. 1A is a partial perspective view showing a removable media tray assembly in the center console of a vehicle according to an exemplary embodiment.
Figure 1B:
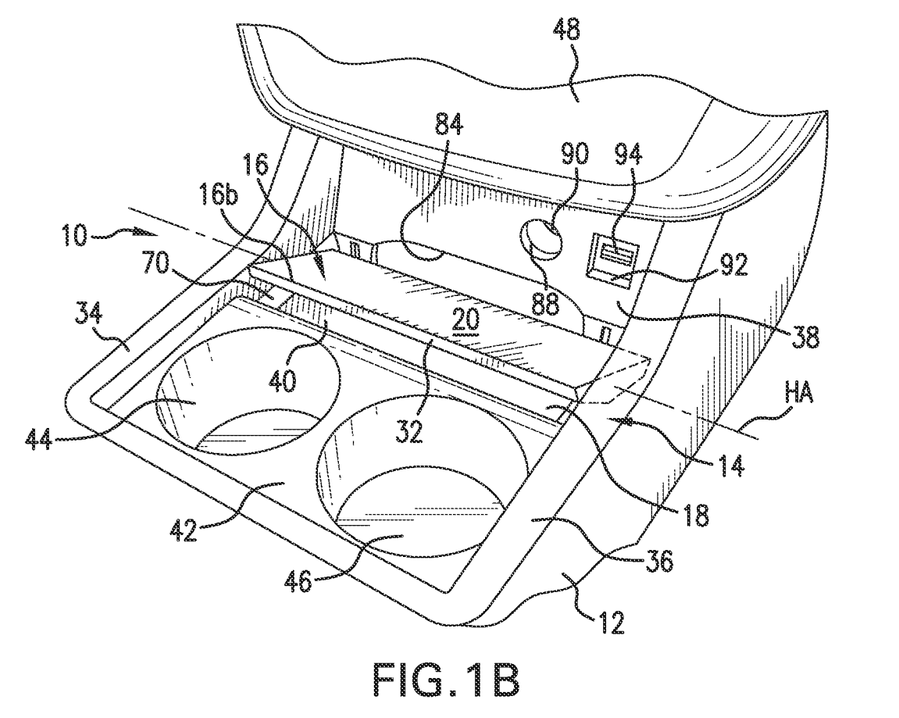
FIG. 1B is a partial perspective view similar to FIG. 1A but showing a pivoting support tray of the assembly tilted or pivoted as occurs during installation or removal of the support tray from the center console.
Figure 1C:
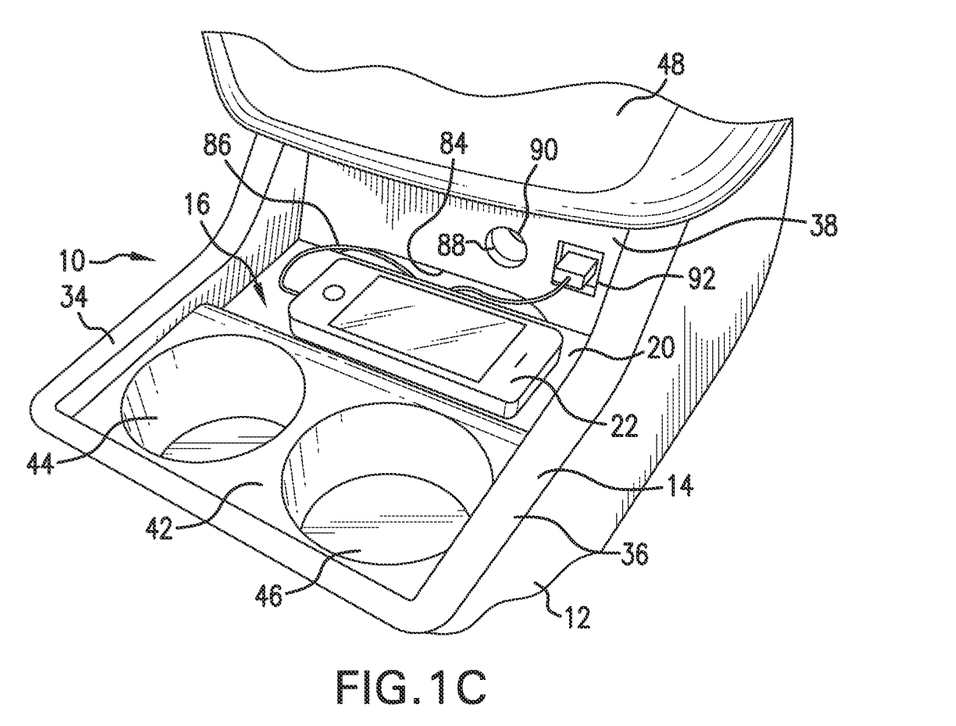
FIG. 1C is a partial perspective view also similar to FIG. 1 but showing a portable electronic device supported by the support tray.

Referring now to the drawings wherein the showings are for purposes of illustrating one or more exemplary embodiments and not for purposes of limiting the same, FIG. 1A shows a removable media tray assembly 10 for and disposed within a vehicle 12. The tray assembly 10 includes a console structure 14 disposed in the vehicle 12 and a pivoting support tray 16 removably and complementarily received by the console structure 14. FIG. 1B shows the support tray 16 in a first pivot position used for installing and removing the support tray 16 relative to the console structure 14. FIG. 1C shows the support tray 16 in a second pivot position (same as the position illustrated in FIG. 1A) where a horizontal support surface 20 of the support tray 16 supports a portable electronic device 22.

Figure 2A:
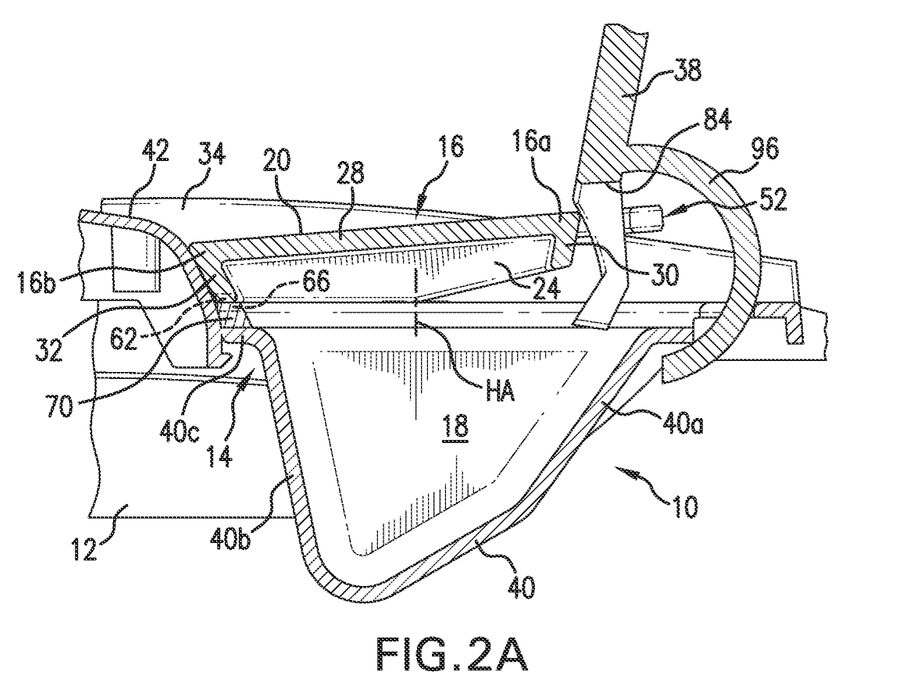
FIG. 2A is a cross-sectional view of the removable media tray assembly of FIG. 1A showing the support tray in the same position as shown in FIG. 1A.
Figure 2B:
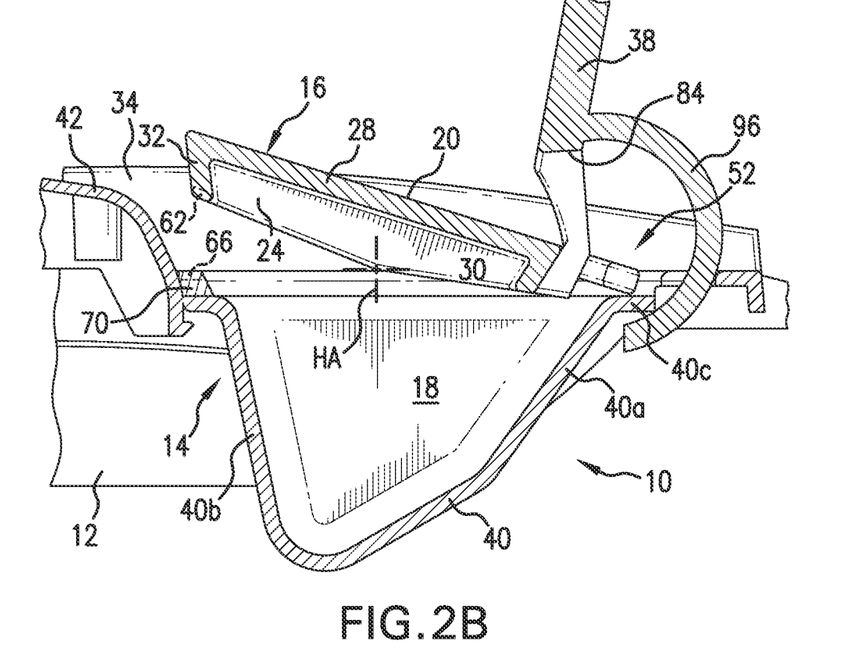
FIG. 2B is a cross-sectional view similar to FIG. 2A but showing the support tray in the same position as shown in FIG. 1B.
Figure 2C:
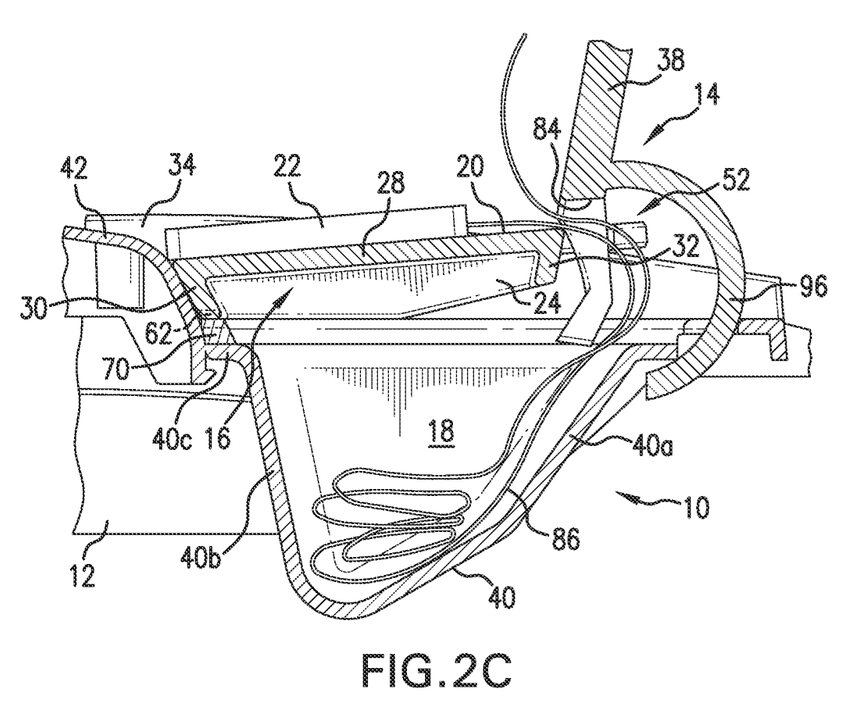
FIG. 2C is a cross-sectional view also similar to FIG. 2A but showing the portable electronic device supported on the support tray.

As shown, the console structure 14 defines a storage compartment 18 and the support tray 16 is removably and complementarily received by the console structure 14 to close the storage compartment 18. By this arrangement, the support tray 16 provides the horizontal support surface 20 in a horizontal orientation when in the first position for supporting an object, such as the portable electronic device 22. More particularly, and as will be described below in further detail, the support tray 16 is configured to pivot relative to the console structure 14 between the first position (the position shown in FIGS. 1B and 2B for installing and removing the support tray 16 and the second position (the position shown in FIGS. 1A, 1C, 2A and 2C) for locking the support tray 16 to the console structure 14.

In the illustrated embodiment, the console structure 14 is a center console structure, which can be disposed between front seats (not shown) of the vehicle 12, and the storage compartment 18 defined by the console structure 14 is an upward-facing storage compartment, though the console structure 14 need not be limited to a center console structure and the storage compartment need not be limited to an upward-facing storage compartment. As shown, the support tray 16 of the illustrated embodiment is specifically supported on or by the console structure 14 at a location above the storage compartment 18 and, more particularly, the support tray 16 is complementarily received between walls of the console structure 14 in a pivoting or rocking arrangement. More particularly, the support tray 16 is configured to pivot or rock between the first position (shown in FIGS. 1A, 1C, 2A and 2C) wherein the support tray 16 is locked into position for supporting an object and the second position (shown in FIGS. 1B and 2B) wherein the support tray is arranged for installation or removal from the console structure 14. In the embodiment of FIGS. 1-4, the support tray 16 is structurally configured so as to be pivotally movable about a laterally extending horizontal axis HA between the first position and the second position, wherein the horizontal axis HA is defined, at least in part, by an apex on an underside 26 of the support tray 16.

Figure 4:
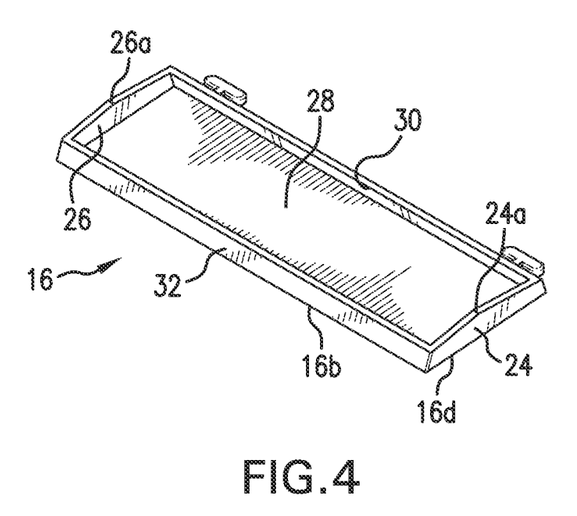
FIG. 4 is an isolated perspective view of the support tray showing an apex defined on an underside thereof.

With specific reference to FIG. 4, the apex on the underside of the support tray 16 is particularly defined by apex portions 24a, 26a of lateral wall portions 24, 26 of the support tray 16. The lateral wall portions 24, 26 depend from a main wall portion 28 of the support tray 16, which defines the horizontal support surface 20 opposite a side from which the lateral wall portions 24, 26 depend. Cross wall portions, including a forward wall portion 30 and a rear wall portion 32, also depend from the main wall portion 28 and span between the lateral wall portions 24, 26. The cross wall portions 30, 32 converge toward one another toward respective distal ends thereof. The horizontal axis HA is particularly defined by the apex portions 24a, 26a. As will be described in more detail below, the apex portions 24a, 26a are supported by the console structure 14 and enable pivoting or rocking of the support tray 16 relative to the console structure 14.

The console structure 14 of the illustrated embodiment includes spaced apart lateral wall portions or structures 34, 36 between which the storage compartment 18 is defined. The console structure 14 also includes a forward wall portion or structure 38 disposed at or adjacent a forward side 40a of a bin portion or structure 40 that defines the storage compartment 18. As used herein, forward and rearward are used in accord with a forward direction of the vehicle 12 and a rearward direction of the vehicle 12. Thus, the forward wall structure 38 is disposed toward a forward end of the vehicle 12. The console structure 14 further includes a rearward wall portion or structure 42 spaced apart from the forward wall structure 38 and spanning between the lateral wall structures 34, 36. A rear side 40b of the bin structure 40 mates with the rearward wall structure 42 in the illustrated embodiment. Additionally, the rearward wall structure 42 of the illustrated embodiment defines at least one cup holder, and particularly two cup holders 44, 66. By this arrangement, the storage compartment 18 is particularly disposed between the at least one cup holder, i.e., the cup holders 44 and 46 in the illustrated embodiment, and a dashboard 48 of the vehicle. The forward wall structure 38 forms a part of the dashboard 48 or is disposed adjacent and immediately below the dashboard 48.

Figure 3A:
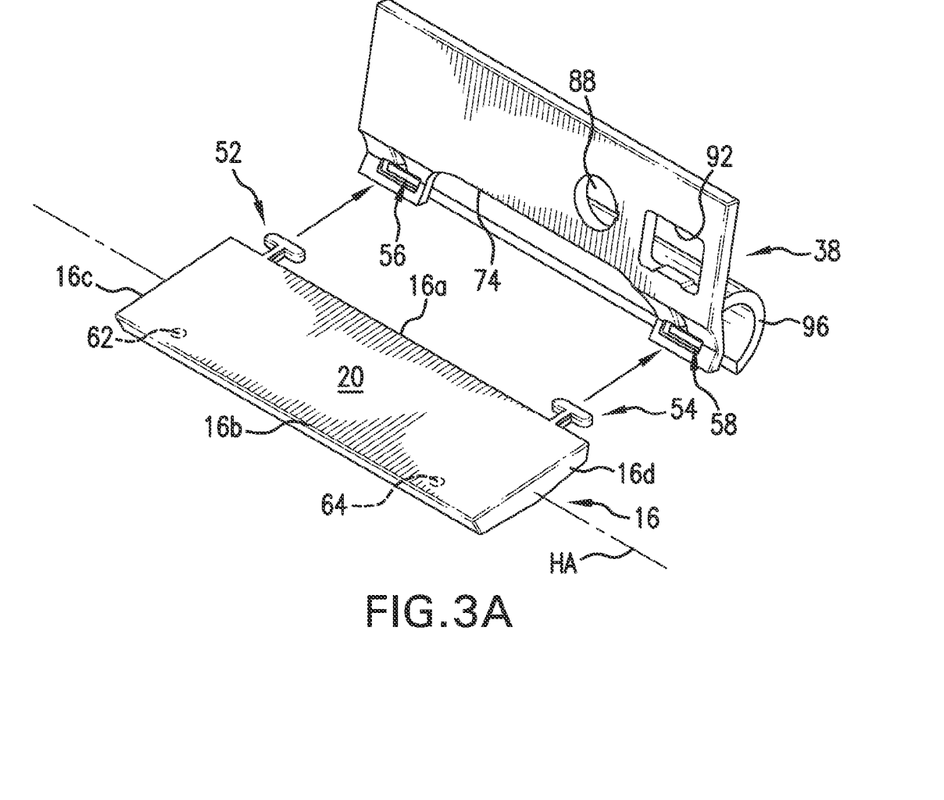
FIG. 3A is an isolated perspective view showing the support tray and a front wall structure of the center console.

With further reference to FIG. 3A, the support tray 16 includes at least one locking tab disposed along a forward edge 16a thereof and the console structure 14 defines at least one aperture for receiving the at least one locking tab. More particularly, in the illustrated embodiment, the at least one tab is a pair of laterally spaced apart locking tabs 52, 54 disposed along the forward edge 16a of the support tray 16 with each locking tab 52, 54 disposed adjacent lateral edges 16c, 16d of the support tray 16 (i.e., defined by the lateral wall portions 24, 26) and the at least one aperture for receiving the at least one locking tab is a pair of corresponding laterally spaced apart tab apertures 56, 58 defined in the forward wall structure 38 for, respectively, receiving the locking tabs 52, 54. In addition, the support tray 16 can include a latching device disposed along a rearward edge 16b thereof that removably connects the support tray 16 to the console structure 14 at the rearward edge 16b.

The latching device can be at least one magnet disposed on one of the support tray 16 and the console structure 14 and at least one magnetic element disposed on the other of the support tray 16 and the console structure 14, wherein the at least one magnet is removably connected or connectable to the at least one magnetic element to retain the support tray 16 within the console structure 14, and particularly to removably connect the rearward edge 16b of the support tray 16 to the console structure 14. In the illustrated embodiment, the at least one magnet can be at least one tray magnet disposed along the rearward edge 16b of the support tray 16 and the at least one magnetic element can be at least one console magnetic element disposed on the console structure 14 to which the at least one tray magnet disposed on the support tray 16 is removably connectable. More particularly, and as shown in the illustrated embodiment, the at least one tray magnet can be a pair of tray magnets 62, 64 disposed at laterally spaced apart locations along the rearward edge 50 (e.g., embedded with the wall 32) and the at least one console magnetic element can be a pair of magnets (only magnet 66 shown) disposed at laterally spaced apart locations on a flange member 70 projecting from the rearward wall structure 32 toward the forward wall structure 28. The flange member 70 can have a U-shape including a rear portion in which the magnets 66, 68 are disposed and lateral portions for supporting the lateral wall portions 24, 26 of the support tray 16. The flange member 70 can be supported by a peripheral flange portion 40c of the bin structure 40. Optionally, the flange member 70 and the bin structure 40 can be combined or integrally formed.

The locking tabs 52, 54 of the illustrated embodiment are T-shaped and likewise the tab apertures 56, 58 are T-shaped. Thus, the T-shaped locking tabs 52, 54 of the support tray 16 are removably receivable in the T-shaped tab apertures 56, 58 defined by the console structure 14, and particularly the forward wall structure 38. Each of the locking tabs 52, 54 is moveable within its corresponding tab aperture 56, 58 to pivot the support tray 16 between the first position (corresponding to FIGS. 1B and 2B) wherein the locking tabs 52, 54 are insertable and removable from the tab apertures 56, 58 and the second position (corresponding to FIGS. 1A, 1C, 2A and 2C) wherein the locking tabs 52, 54 are inhibited from insertion into and removal from their tab apertures 56, 58. The first pivot position wherein the locking tabs 52, 54 are insertable and removable from the tab apertures 56, 58 corresponds to locking tabs 52, 54 being received in a lower portion 72 of the tab apertures 56, 58 and the second pivot position, wherein the locking tabs 52, 54 are prevented from insertion into and removal from the tab aperture 56, 58, corresponds to the locking tabs 52, 54 being received in an upper portion 74 of the tab apertures 56, 58 that are disposed above the lower portions 72 of the tab apertures 56, 58.

Figure 3B:
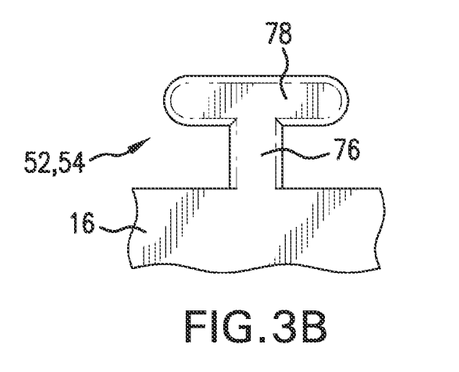
FIG. 3B is a partial enlarged schematic plan view of the support tray showing a T-shaped tab thereof.
Figure 3C:
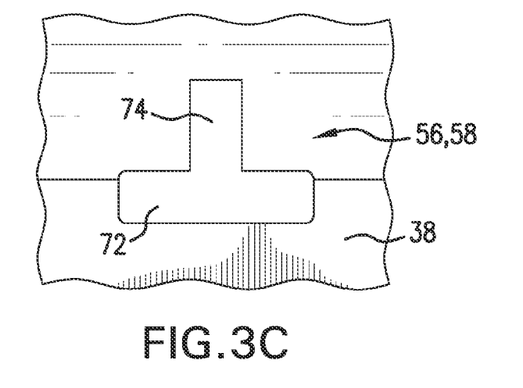
FIG. 3C is a partial enlarged schematic elevational view of the front wall structure showing a T-shaped tab aperture defined therein.

With additional reference to FIGS. 3B and 3C, the locking tabs 52, 54 and the tab apertures 56, 58 are schematically shown so details of these features can be described in further detail. As shown, each of the locking tabs 52, 54 includes a stem portion 76 and a distal cross portion 78. Each of the tab apertures 56, 58 has an inverted T-shape including the lower portion 72 being formed as a lower cross portion to enable insertion and removal of the locking tabs 52, 54 and the upper portion being formed as an upper stem portion extending from the lower cross portion 72. The lower cross portion 72 of the apertures 56 and 58 has a width that is greater than a width of the distal cross portions 78 and the upper stem portion 74 has a width that is less than a width of the distal cross portion 78. The width of the upper stem portion 82 is such that the stem portion 76 can traverse up and down along the upper stem portion 82 between the first position and the second position.

The forward wall structure 38 of the illustrated embodiment can define a cord aperture 84, at least a portion of which is disposed vertically above the tab apertures 56, 58. As shown best in FIGS. 1C and 2C, the cord aperture 18 is in communication with the storage compartment 18 to enable an associated cord (e.g., a cord 86 connected to the portable electronic device 22) to be stored in the storage compartment 18 and have at least one end passed through the cord aperture 84 to reach the horizontal support surface 20 of the support tray 16. In addition, in the illustrated embodiment, the forward wall structure 38 includes a USB aperture 88 providing access to a USB port 90 and a power aperture 92 providing access to a power port 94. It is to be appreciated by those skilled in the art that any number of accessory apertures could be provided in the forward wall structure and such accessory apertures could provide various types of connecting ports for the vehicle 12.

The forward wall structure 38 can further include a cover wall portion 96 that functions to "black out" or hide any portion of the vehicle (e.g., background panels) that might be viewable through the cord aperture 84. This reduces the likelihood that the code aperture 84 will be a focal point in the vehicle thereby improving aesthetics in the vehicle. In the illustrated embodiment, the cover wall portion 96 is C-shaped and curves from an upper end of the cord aperture 84 to an underside of the peripheral flange portion 40c of the bin structure 40 to direct the cord 86 from the horizontal support surface 20 into the storage compartment 18. In alternate embodiments, a flexible or fabric cover (not shown) can be secured (e.g., via heat staking) to the forward wall structure 38 on a rear side of the code aperture 84 so as to depend downward and cover the cord aperture 84.

In operation, the locking tabs 52, 54 can be inserted into the corresponding tab apertures 56, 58 prior to the tray magnets 62, 64 being connected to the console magnets 66, 68 when the support tray 16 is installed in the console structure 14. When the support tray 16 is to be removed, the tray magnets 62, 64 can be disconnected from the console magnets 66, 68 prior to the locking tabs 52, 54 being removed from the tab apertures 56, 58 when removing the support tray 16. More specifically, when installing the support tray 16, the locking tabs 52, 54 are inserted into the tab apertures 56, 58, and particularly into the lower cross portions 72 corresponding to the first position. Once fully inserted, downward pressure can be applied toward or at the rearward edge 16b of the support tray 16 to removably connect the tray magnets 62, 64 to the console magnets 66, 68. This causes the support tray 16 to pivot or rock about a horizontal axis HA on the apex portions 24a, 26a.

Such movement of the support tray 16 also moves the locking tabs 52, 54 vertically upward within the corresponding tab apertures 56, 58 so that the locking tabs 52, 54 move into the upper stem portion 74 of the tab apertures 56, 58 corresponding to the second position and thus the locking tabs 52, 54 can no longer be directly removed from the tab apertures 56, 58. That is, the locking tabs 52, 54 cannot be pulled out of the tab apertures 56, 58 when received or moved to the upper stem portion 74 of the tab apertures 56, 58. To remove the support tray 16, downward pressure is applied at or adjacent the forward edge 16a of the support tray 16. This disconnects the tray magnets 62, 64 from the console magnets 66, 68 and causes the support tray 16 to again pivot or rock about the horizontal axis HA. Such movement results in the locking tabs 52, 54 moving downward and the support tray 16 moving from the second position back to the first position wherein the locking tabs 52, 54 can be removed from the tab apertures 56, 58.

The support tray 16 can advantageously support the portable electronic device 22, which can be a mobile phone, for example. The cord aperture 84 defined in the forward wall structure 38 enables a cord 86 of the portable electronic device 22 to be substantially received and contained within the storage compartment 18. Notably, the cord 86 can remain connected to the portable electronic device 22 and can also be connected to one of the ports 90, 94. This provides improved aesthetics for the vehicle 12 as the cord 86 is substantially hidden from view. Additionally, this removes a substantial part of the cord 86 from becoming a hindrance or obstruction during operation and/or use of the vehicle 12.

Advantageously, the tray assembly 10 enables the cord 86 to be substantially hidden from view. This keeps the cord 86 out of the way and improves the aesthetics inside the vehicle 12. Also advantageously, the tray assembly 10 provides these features in a minimal amount of space, which is particularly a benefit in the area of the center console where not much space is provided for cord management. Additionally, the removability of the support tray 16 is a feature as it enables users to remove the support tray 16 when not needed and/or allows relatively easy access to the storage compartment 18. This may be beneficial for those users that do not desire to use the support tray 16 for a portable electronic device and/or to provide users and use the access to the storage compartment 18, such as may be convenient for cleaning in the case of a spill.

Figure 5:
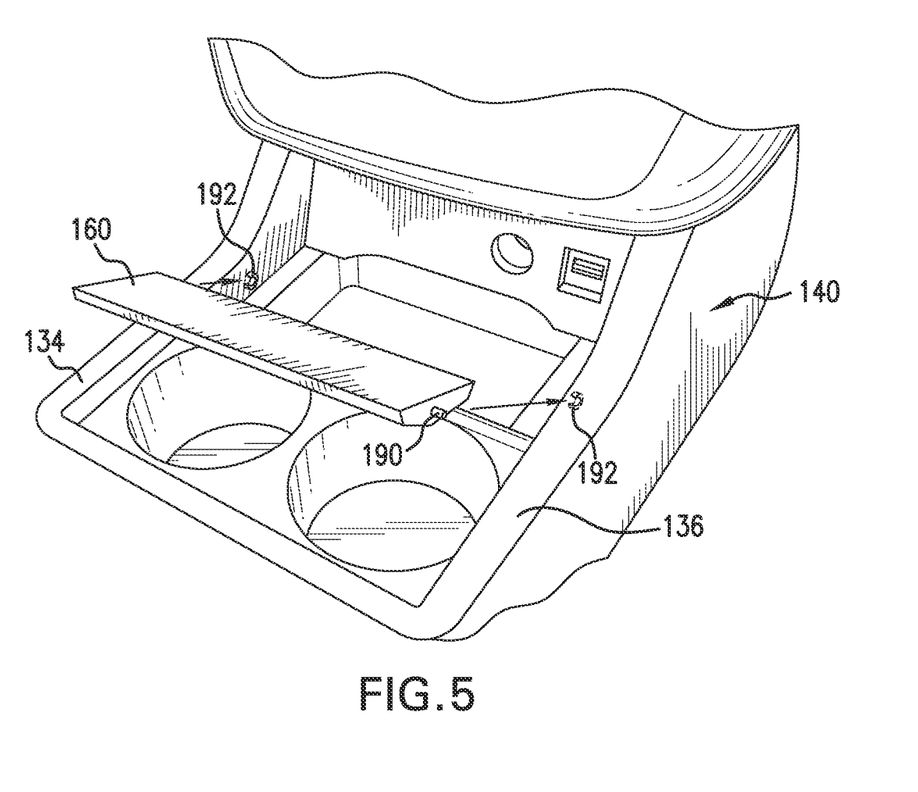
FIG. 5 is a partial perspective view of a removable media tray assembly according to an alternate exemplary embodiment.
Figure 6:
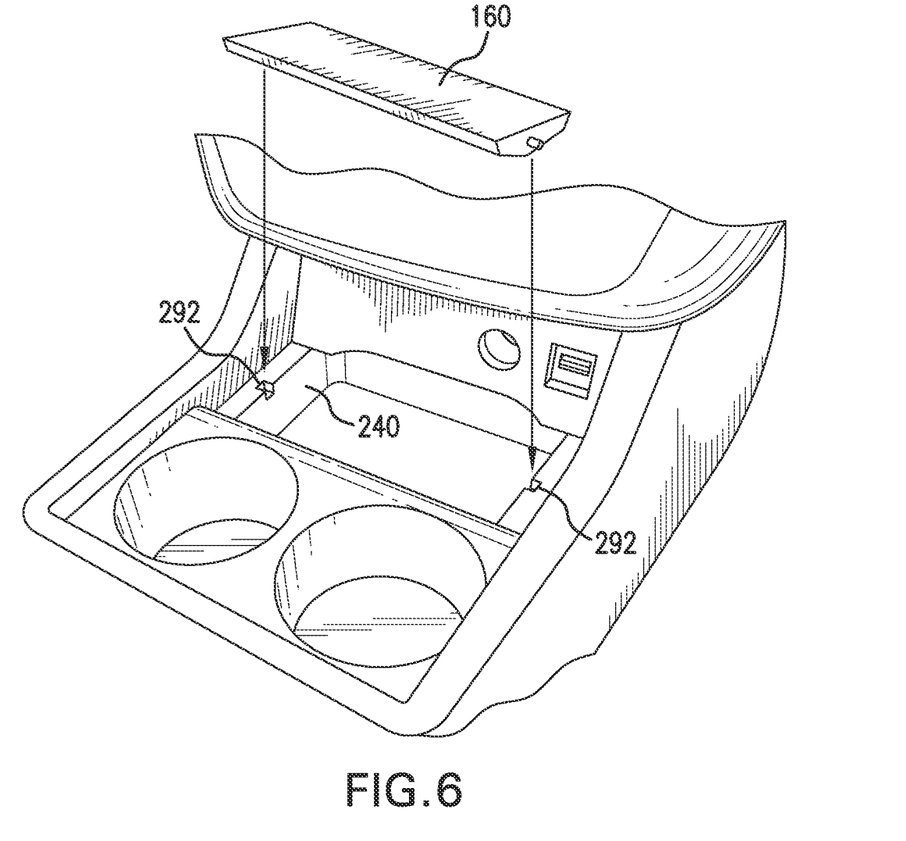
FIG. 6 is a partial perspective view of a removable media tray assembly according to another alternate exemplary embodiment.
Figure 7:
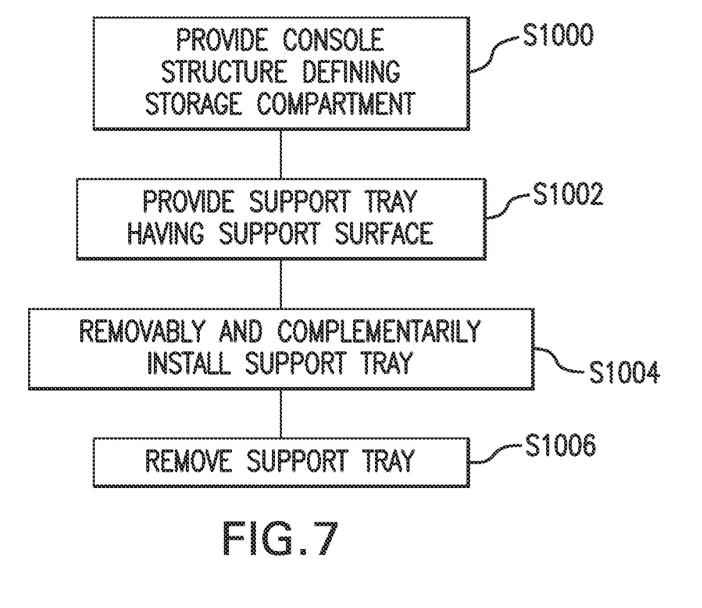
FIG. 7 is a process flow diagram illustrating a vehicle removable media tray method according to an exemplary embodiment.

With reference now to FIGS. 5 and 6, alternate exemplary embodiments are illustrated wherein one of a support tray and a console structure includes pivot pins extending therefrom and the other of the support tray and the console structure includes pivot pin apertures that receive the pivot pins to pivotally support the support tray relative to the console structure. More particularly, in the alternate embodiment illustrated in FIG. 5, pivot pins 190 are provided on support tray 160, and particularly the pivot pins 190 are disposed respectively at lateral ends of the support tray 160. Pivot pin apertures 192 are provided on lateral wall structures 134, 136 that receive the pivot pins 190 to pivotally support the support tray 160 relative to the console structure 140. Though not shown, tabs and tab apertures could be provided as described hereinabove in reference to the embodiment shown and described in FIGS. 1A-4. In FIG. 6 another alternate embodiment is shown that is similar to the embodiment depicted in FIG. 6 but the pivot pin apertures 292 of FIG. 7 are shown as being recessed into side walls of a bin portion 230.

With reference now to FIG. 8, a vehicle removable media tray method will now be described. In particular, the method of FIG. 8 will be described in association with the embodiments described hereinabove, though it is to be appreciated by those skilled in the art that the method of FIG. 8 could be used with other removable tray assemblies. In the method of FIG. 8, as indicated at S1000, the console structure 14 disposed in the vehicle 12 is provided and defines the storage compartment 18. Also, as shown at S1002, the support tray 16 having a horizontal support surface 20 disposed thereon is provided. At S1004, the support tray 16 can be removably and complementarily installed on the console structure 14 over the storage compartment 18 to close the storage compartment 18. When so desired, the support tray 16 can be removed from the console structure 14, as indicated at S1006, and as described hereinabove.

Installing the support tray in S1000 on the console structure 14 can include inserting the locking tabs 52, 54 into the tab apertures 56, 58 of the console structure 14, and subsequently pivoting the support tray 16 to removably connect the tray magnets 62, 64 of the support tray 16 to the console magnets 66, 68 of the console structure 14. Removing the support tray at S1006 can include reverse pivoting (i.e., pivoting in an opposite rotational direction) the support tray 16 to disconnect the tray magnets 62, 64 from the console magnets 66, 68 and subsequently removing the locking tabs 52, 54 from the tab apertures 56, 58.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A removable media tray assembly for a vehicle, comprising:
    a console structure disposed in the vehicle and defining a storage compartment; and
    a pivoting support tray removably and complementarily received by the console structure to close the storage compartment and provide a horizontal support surface for supporting an object, the support tray pivotally movable to a first pivot position that enables access to the storage compartment and removability of the support tray and a second pivot position that closes the storage compartment and wherein the pivoting support tray includes at least one locking tab disposed along a forward edge thereof and the console structure defines at least one tab aperture for receiving the at least one locking tab, the forward edge being a forward-most edge relative to a forward direction of travel for the vehicle.

2. The removable media tray assembly of claim 1 wherein the at least one locking tab is movable within the at least one tab aperture to pivot the pivoting support tray between the first pivot position wherein the at least one locking tab is insertable and removable from the at least one tab aperture and the second pivot position wherein the at least one locking tab is inhibited from insertion into and removal from the at least one tab aperture.

3. The removable media tray assembly of claim 2 wherein the first pivot position wherein the at least one locking tab is insertable and removable from the at least one tab aperture corresponds to the at least one locking tab being received in a lower portion of the at least one tab aperture and the second pivot position wherein the at least one locking tab is prevented from insertion into and removal from the at least one tab aperture corresponds to the at least one locking tab being received in an upper portion of the at least one tab aperture that is disposed above the lower portion of the at least one tab aperture.

4. The removable media tray assembly of claim 3 wherein each of the at least one tab has a T-shape including a stem portion and a distal cross portion, and each of the at least one tab aperture has an inverted T-shape including the lower portion being formed as a lower cross portion to enable insertion and removal of the at least one locking tab and the upper portion being formed as an upper stem portion extending upward from the lower cross portion, the lower cross portion of the at least one tab aperture having a width that is greater than a width of the distal cross portion, and the upper stem portion having a width that is less than the width of the distal cross portion.

5. The removable media tray assembly of claim 4 wherein the at least one locking tab includes two laterally spaced apart tabs disposed along the forward edge of the pivoting support tray and disposed adjacent lateral edges of the pivoting support tray.

6. The removable media tray assembly of claim 1 wherein the pivoting support tray includes a latching device disposed along a rearward edge thereof that removably connects the pivoting support tray to the console structure at the rearward edge.

7. The removable media tray assembly of claim 6 wherein the latching device is at least one tray magnet disposed along the rearward edge thereof that is removably connectable to at least one console magnetic element disposed on the console structure.

8. The removable media tray assembly of claim 7 wherein the at least one locking tab is inserted into the at least one tab aperture prior to the at least one tray magnet connecting to the at least one console magnetic element when the pivoting support tray is installed in the console structure, and the at least one tray magnet is disconnected from the at least one console magnetic element prior to the at least one locking tab being removed from the at least one tab aperture when removing the pivoting support tray.

9. The removable media tray assembly of claim 1 wherein the console structure includes a wall structure disposed at or adjacent a forward side of the storage compartment and the wall structure defines the at least one tab aperture, the wall structure also defines a cord aperture disposed above the at least one tab aperture, the cord aperture in communication with the storage compartment to enable an associated cord to be stored in the storage compartment and have at least one end passed through the cord aperture to horizontal support surface of the pivoting support tray.

10. The removable media tray assembly of claim 1 wherein the pivoting support tray is pivotally movable between the first pivot position and the second pivot position about a laterally extending horizontal axis, the horizontal axis defined by an apex on an underside surface of the support tray.

11. The removable media tray assembly of claim 1 wherein one of the pivoting support tray and the console structure includes pivot pins extending therefrom and the other of the pivoting support tray and the console structure includes pivot pin apertures that receive the pivot pins to pivotally support the pivoting support tray relative to the console structure.

12. The removable media tray assembly of claim 11 wherein the pivoting support tray includes the pivot pins disposed respectively at lateral ends of the pivoting support tray, the pivot pin apertures are defined by sidewalls of the console structure.

13. The removable media tray assembly of claim 1 wherein the console structure is a center console structure disposed centrally in a vehicle and the storage compartment is disposed between at least one cup holder and a dashboard of the vehicle.

14. The removable media tray assembly of claim 1 further including:
    at least one magnet disposed on one of the pivoting support tray and the console structure; and
    at least one magnetic element disposed on the other of the pivoting support tray and the console structure, the at least one magnet removably connected to the at least one magnetic element to retain the pivoting support tray within the console structure in the second pivot position.

15. A removable tray assembly disposed in a vehicle, comprising:
    a center console structure defining an upward facing storage compartment; and
    a support tray removably supported on the center console structure above the upward facing storage compartment for supporting an associated object, the support tray complementarily received between walls of the center console structure and configured to pivot relative to the center console structure between a first position for installing and removing the support tray and a second position for locking the support tray to the center console structure, and wherein the support tray includes at least one locking tab disposed along a forward edge thereof and the console structure defines at least one tab aperture for receiving the at least one locking tab, the forward edge being a forward-most edge relative to a forward direction of travel for the vehicle.

16. The removable tray assembly of claim 15 wherein the support tray includes T-shaped tabs extending therefrom that are removably received in T-shaped tab apertures defined by the center console structure when the support tray is in either of the first position or the second position.

17. The removable tray assembly of claim 16 wherein the support tray includes magnets removably connected to magnetic elements mounted to the center console structure only when the support tray is in the second position.

18. A vehicle removable media tray method, comprising:
    providing a console structure disposed in a vehicle and defining a storage compartment;
    providing a pivoting support tray having a horizontal support surface disposed thereon; and
    removably and complementarily installing the pivoting support tray on the console structure over the storage compartment to close the storage compartment;
    removing the support tray from the console structure,
    wherein installing the support tray on the console structure includes inserting at least one tab of the support tray disposed along a forward edge of the support tray into at least one tab aperture of the console structure, and subsequently pivoting the support tray to removably connect at least one magnet of the support tray to at least one magnetic element of the console structure, and
    wherein removing the support tray includes reverse pivoting the support tray to disconnect the at least one magnet from the at least one magnetic element and subsequently removing the at least one tab from the at least one tab aperture.

19. The removable tray assembly of claim 15 wherein the support tray is pivotally movable to a first pivot position that enables access to the storage compartment and removability of the support tray and a second pivot position that closes the storage compartment.

20. The removable media tray assembly of claim 17 wherein said magnets include at least one tray magnet disposed along the rearward edge of the support tray that is removably connectable to at least one console magnetic element disposed on the center console structure.

* * * * *